July 14, 1936.  H. ANTRANIKIAN  2,047,609
MAGNETIC FIELD DIRECTION AND INTENSITY FINDER
Filed Aug. 25, 1933
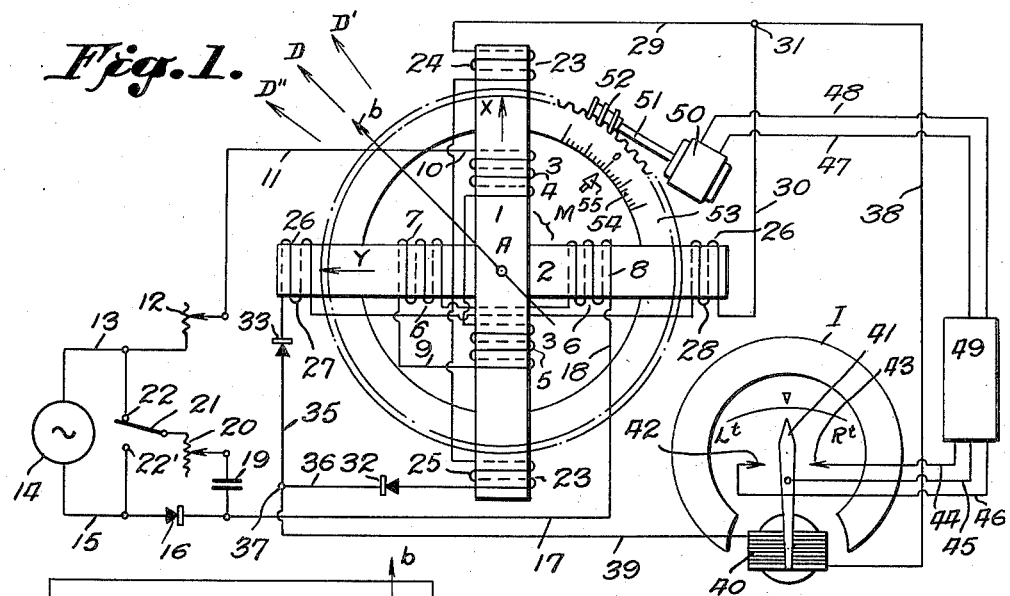
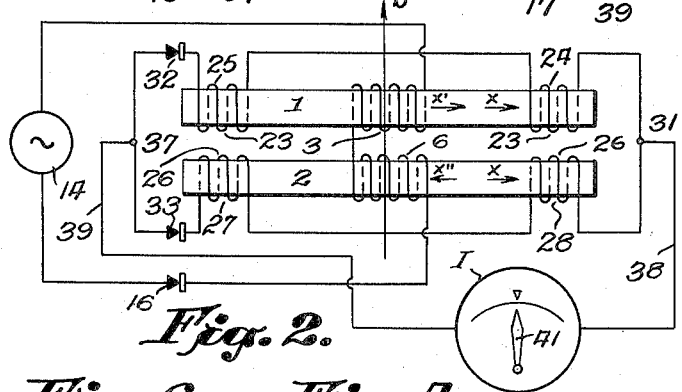
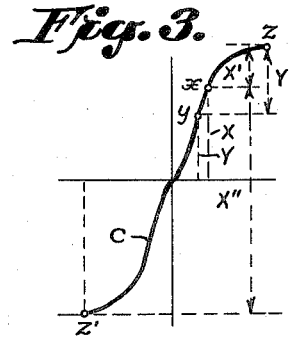
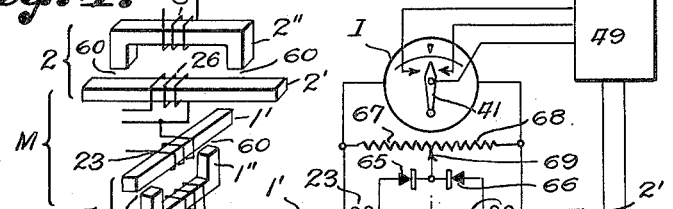
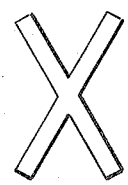
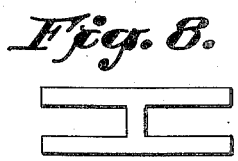
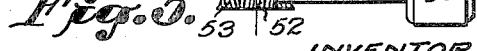
INVENTOR
Haig Antranikian
by Philipp, Sawyer, Rice & Kennedy,
attys.

Patented July 14, 1936

2,047,609

UNITED STATES PATENT OFFICE 2,047,609

MAGNETIC FIELD DIRECTION AND INTENSITY FINDER

Haïg Antranikian, Providence, R. I.

Application August 25, 1933, Serial No. 686,801

21 Claims. (Cl. 33—204)

The invention relates to a magnetic field direction and intensity finder which may be used as a magnetic compass which will be particularly described herein; the invention, however, may be applied to other various uses a few of which will be mentioned.

It is known that the ordinary magnetic compass (pivoted magnetic needle) has certain defects that make its use inconvenient, particularly when used on airplanes; among these defects may be mentioned the slow response of the needle to a change of direction of the airplane or craft on which the compass is fixed, and the tendency of the needle, when started, to swing about the right position (because of its inertia) before pointing to this position. To avoid these defects of the ordinary compass, "inductor" compasses have been constructed, but they were not practically satisfactory having some defects of their own, particularly because they included continuously rotating parts and commutator.

In the present invention no continuously rotating part is used; the direction is found by setting a rotatable core system in a position giving zero reading on a current indicating instrument. When the apparatus is installed on an airplane, it may be conveniently used for steering in a constant direction—relatively to the horizontal component of the earth's magnetic field—by observing, for instance, the pointer of said instrument; when the airplane is off direction, the direction of deflection of the pointer indicates to the pilot whether he has to turn to the left or to the right to correct the direction of the airplane. There is no uncertainty of 180°. The response of the pointer to a change of direction is practically immediate. On the other hand, an apparatus constructed according to the present invention may be light in weight, an advantage for use on airplanes.

One object of the invention is to receive magnetic fluxes in two cores from the external magnetic field—the direction of which is to be found—and to compare the fluxes in the two cores.

Another object of the invention is to periodically saturate two magnetic cores, partially magnetized or not, and to compare the saturating fluxes in the two cores.

Another object of the invention is to readily and continually indicate the deflections of two magnetic cores from any desired angular relation with the direction of the external field.

Another object of the invention is to automatically adjust magnetic cores in a direction corresponding to the direction of a magnetic field.

These objects, and others, will clearly appear in the following specification and drawing in which:

Figures 1 and 2 are diagrammatic views showing a preferred embodiment of the invention with respectively two crossed and two parallel magnetic cores;

Figure 3 is a diagram for explaining the operation of the apparatus;

Figures 4 and 6 are diagrammatic views of composite core systems;

Figure 5 is a diagrammatic view of an embodiment of the invention using a double composite core system;

Figures 7 and 8 show diagrammatically modifications in the arrangements of the cores.

In the preferred embodiment of the invention illustrated by Figure 1, 1 and 2 are two magnetic cores, forming a magnetic core system M, in which fluxes may be induced by the external magnetic field the direction of which is to be found; these cores must have permeability proportioned to the intensity of the external field, that is to say, a noticeable flux should be induced by this field without, however, saturating the cores. For example, when the apparatus is used as a magnetic compass, the cores 1 and 2 are preferably made of highly permeable alloy, such as permalloy or other iron-nickel alloy, iron-cobalt alloy, etc. It is preferred also to have the cores laminated, identical as for the size, and symmetrically disposed relatively to each other. They may have any angular relation with each other; it is preferred, however, to have them either perpendicular, as shown in Figure 1, or parallel, as shown in Figure 2. They are rotatable as a unit about an axis A.

Let it be supposed that the core system M of Figure 1 is in an external uniform magnetic field having, for instance, the direction of the arrow D, symmetrical relatively to the two cores (at 45° from each of them in Figure 1). A flux will be induced in each of the cores; the two fluxes are symbolically indicated by arrows X and Y. It is obvious that, when the external field has the same direction as the axis $b$, symmetrical relatively to the two cores,—i. e. at 45° from each of them as indicated by arrow D—the two fluxes X and Y will be equal in intensity or magnitude (assuming that the cores are identical), and it may be supposed that they have the same sign for this direction of field D; the fluxes X and Y would also be equal when the direction of the field is one of the three other directions symmetrical relatively to the cores; but for these other directions either of the fluxes X or Y, or both, would have another sign. It is obvious also that, when the direction of the field is not symmetrical relatively to the cores 1 and 2, one of the fluxes will be greater in intensity or magnitude than the other; for instance, when D' is the direction of the field, X will be greater than Y and, if D" is the direction of the field, Y will be greater than X. But the fluxes X and Y may always be rendered equal in amplitude and in sign by rotating the core system M about the axis A so as to render axis b parallel to arrow D. Therefore, with a means for comparing and observing the equality and inequality of amplitudes and signs of fluxes X and Y, it would be easy to determine the direction of the external magnetic field by rotating the core system M until equality of the induced fluxes is observed; the direction would be read, for instance, before a fixed index 55 on a scale 54 rotating with the members, or other equivalent angle-reading device.

It is not convenient, however, for practical use, to compare directly the fluxes X and Y induced by the external magnetic field in the cores 1 and 2. The method used in the apparatus illustrated by the drawing compares, instead of the fluxes X and Y, the current induced by the additional fluxes which should be added to these fluxes X and Y to saturate the cores 1 and 2. This method may be better understood by first referring to the diagram of Figure 3, in which C is the curve of induction of the substance of which the cores 1 and 2 are made, the abscissæ representing magnetomotive forces, and the ordinates representing average flux densities induced by the external field or by magnetomotive forces in a core. Let it be supposed that $x$ and $y$ are the representative points corresponding to the fluxes X and Y, respectively. Let it also be supposed that the cores 1 and 2 are saturated by additional fluxes X' and Y' so as to have the representative point $z$ for the fluxes in both cores; it is easy to see that the additional saturating fluxes X' and Y' will be equal or inequal at the same time as the fluxes X and Y, and their difference is the same (except for the sign which is reversed). Therefore, a means for indicating equality of the additional fluxes X' and Y' will show at the same time equality of the fluxes X and Y induced by the external magnetic field.

In the foregoing the hysteresis phenomenon (or other analogous phenomena which may exist in the cores) has been omitted for simplicity of explanations as, practically, this effect does not change the results.

A means for periodically saturating the cores and for indicating equality or differences between the additional fluxes X' and Y' is illustrated in either Figures 1, 2 or 5; for these purposes, the cores are wound with a primary winding for saturating and a secondary winding for indicating equality or differences. Core 1 is wound with a primary winding which, taken as a whole, will be referred to by numeral 3—(shown in Figure 1 as formed by coils 4 and 5 in series); likewise, core 2 is wound with a primary winding which, taken as a whole, will be referred to by numeral 6 (shown in Figures 1 and 2 as formed by coils 7 and 8 in series). The two windings 3 and 6 are preferably connected in series by way of lead 9; they may be, however, connected in parallel, if desired. The circuit of these windings is completed as follows: The end 10 of winding 3 is connected, by way of lead 11, through an adjustable resistance 12 and by way of lead 13, to a terminal of a source 14 of alternating electromotive force (symbolically indicated); thence, from the other terminal of source 14, by way of lead 15, through a rectifier 16 and by way of lead 17, to the terminal 18 of winding 6. Thus the circuit of the primary windings is closed through an adjustable resistance 12, an alternating electromotive force source 14 and a rectifier 16, these elements being of any known type.

It is readily seen that the source of alternating electromotive force will cause a periodical direct current to flow through the primary windings, which current may be strong enough to saturate the cores 1 and 2, and the coils may be wound so as to have the additional fluxes in the same direction as fluxes X and Y induced by the external magnetic field; therefore, the flux in core 1, for instance, will vary periodically between the representative points $x$ and $z$ (Figure 3), and the flux in core 2 will vary between representative points $y$ and $z$ (assuming for simplicity that the flux induced by the external magnetic field is negligible when the members are saturated, on account of the relatively high reluctance at that moment); thus the cores 1 and 2 are periodically saturated and de-saturated by additional fluxes X' and Y' alternately added and suppressed by means of a periodical current in the primary circuit.

These fluxes X' and Y' are compared by means of secondary windings, forming a secondary circuit, which will now be described. Core 1 is wound with a secondary winding which, taken as a whole, will be referred to by numeral 23 and is shown in Figures 1 and 2 as formed by coils 24 and 25 in series. Core 2 is wound with a secondary winding—which, taken as a whole, will be referred to by numeral 26—and is shown in Figures 1 and 2 as formed by coils 27 and 28 in series. By way of leads 29 and 30 two of the ends of the secondary windings 23 and 26 are connected to a common terminal 31. The other ends of these secondary windings are connected to rectifiers 32, 33, respectively, which may be either half-wave or full-wave rectifiers; the two rectifiers are connected, by means of leads 35, 36, to another common terminal 37. On the other hand, the terminals 31 and 37 are connected to the ends of the movable coil 40 of a galvanometric instrument or relay I, the terminal 31 being connected by way of lead 38, and the terminal 37 being connected by way of lead 39.

As explained before, the primary windings periodically induce variable fluxes of amplitudes X' and Y' in cores 1 and 2; these fluxes are also fluxes that vary within the secondary windings 23 and 26 wound on the same cores or the same magnetic circuit; therefore, electromotive forces, E and F, are created by these variable fluxes in windings 23 and 26, respectively, which electromotive forces are proportional, or at least a function of, the fluxes X' and Y'. The rectifiers 32 and 33 being connected, as indicated, so as to rectify in opposite directions relatively to the circuit of the galvanometer (coil 40), the current in coil 40 will be approximately proportional to E—F, as will be understood by persons familiar with the art; that means that the pointer 41 of instrument I, attached to movable coil 40, will deflect in one direction or the other according to the sign of X'—XY', and will remain on the zero position when the fluxes X' and Y' are equal (since X'—Y' is nil). If it is remembered that X' is greater or smaller than Y' according to whether the direction of the external magnetic field is D' or D'', it is readily understood that the pointer 41 will deflect, say, to the right when the direction of the field is D', it will deflect to the left when the direction of the field is D'', and will read zero when the direction is D. Therefore, the direction of the external magnetic field may be easily found by turning the core system M until the pointer of instrument I reads zero; the direction of the external field will be indicated by the direction of bisecting axis $b$. It is true that the pointer of instrument I will also read zero for a position of core system M diametrically opposite to the position indicating the true direction; but, without going into detailed explanations, it may be said that, when the position of core system M corresponds to said opposite direction, the deflections of the pointer are also opposite to that corresponding to the true direction for a same sense of rotation of the cores from the positions of zero readings; therefore, it will be easy for an operator to distinguish the true direction from the diametrically opposite direction.

When the apparatus is used as a compass on a craft, the pilot may easily adjust the core system M, or the bisecting axis $b$, to any desirable direction relatively to the axis of the craft and navigate by observing the pointer of instrument I; he will turn, for instance, to the right when the pointer deflects to the right, and he will turn to the left when the pointer deflects to the left, and thus he will keep always the same angular relation relatively to the direction of the earth's magnetism.

The sensitivity of indications—that is, the deflections of the pointer 41 for, say, one degree rotation of the core system M—increases with the ratio, R, of the permeability of the cores to the additional saturating fluxes $X'$, $Y'$. This ratio may be adjusted for the best results by means of a condenser 19 one terminal of which is connected to lead 17 and the other terminal of which is connected, through an adjustable resistor 20, to a switch 21; this switch connects the said other terminal of the condenser either to lead 13, by throwing the switch on terminal 22, or to lead 15 by throwing the switch on terminal 22'.

When the external magnetic field is weak, the representative points $x$ and $y$ (Figure 3) are low on curve C and may correspond to low ratio R, since $X'$ and $Y'$ are relatively large in this case. This defect may be avoided by adding a permanent current to the periodical current in the primary windings, that is to say, by adding a permanent magnetomotive force to the periodical magnetomotive force, thus adding a permanent flux to the fluxes induced by the external magnetic field; by this means the representative points $x$ and $y$ will be raised on curve C, and the ratio R will be improved. This improvement may be accomplished by the condenser 19 with the switch on terminal 22, the condenser being thus connected in shunt to the primary windings; as periodical rectified currents are induced in these windings, such an arrangement causes the flow of a permanent direct current in the circuit, as is known. By varying the resistance 20, in series with the condenser, the permanent current may be adjusted to correspond to the best ratio R (or any desired value of ratio R).

When the external magnetic field is too strong, it may also cause insensitivity of the apparatus, because the cores 1 and 2 may be saturated, or nearly saturated, before any saturating flux is added; in this case it is desirable to add to the primary periodically saturating current in the primary windings a current which lowers the fluxes induced by the external magnetic field when the cores are de-saturated; this may be done by adding in the windings a permanent, relatively weak, current opposite to the periodical saturating current; such a negative current may be obtained by shunting the rectifier 16 by a condenser, which acts then as a leak through the rectifier. It is readily seen that this arrangement of a condenser shunting the rectifier is accomplished by throwing the switch 21 on terminal 22', and that the variable resistance 20 may adjust the leak (or the current opposite to the rectified current) to the proper value.

It may be remarked that, in certain types of rectifiers, such as copper-oxide rectifiers or the like, there may be a leak by imperfect rectification without any capacity in shunt to the rectifier. In this case, the condenser 19 connected to add a permanent direct current of same sign as the rectified current, i. e. the switch 21 on terminal 22, may correct this defect by compensating the leak by a permanent direct current in opposite direction.

In the apparatus as described above, the cores 1, 2 are turned until null current is observed on instrument I. Under certain circumstances it may be preferred to have an automatic adjustment of the cores in a direction giving null reading on instrument I.

Figure 1 shows a simple additional device for accomplishing this automatic adjustment. The instrument I is arranged as a relay, the pointer 41 being arranged as a movable contact member which engages contact 42, when it deflects to the left, and contact 43, when it deflects to the right. The contact member (or pointer) 41 and the contacts 42, 43, are connected through leads 44, 45, 46, respectively, to a motor controlling system 49, which in turn is connected to the controlled motor 50 by way of leads 47, 48. The motor controlling system 49 is a means which makes the motor turn in one or the other direction according to whether the contact member 41 engages one or the other of the contacts 42, 43; such means are known, and for this reason the controlling system 49 is merely indicated (in Figures 1 and 5) by a rectangle. On the shaft 51 of the motor is mounted a worm 52 meshing with a worm-gear 53; this worm gear is shown as being formed by the edge of scale 54 and, therefore is attached to the core system M and turns as a unit with it about the axis A. The operation of the device is obvious; assuming, for instance, that the direction of the external field is D' relatively to the direction of bisecting axis $b$, the member 41 will deflect, say, to the right and will engage contact 43, causing thus, through the controlling system 49, the rotation of the motor 50 in a certain direction; if the connections are suitably made, this direction of rotation is such that the worm gear 53, and therefore the axis $b$ of the core system, rotates in the direction D' of the external field (that is, clockwise on Figure 1); when the axis $b$ reaches the direction D', the member 41 comes back to its neutral position, the motor stops, leaving thus the axis $b$ pointing in the direction D' of the external magnetic field. If the direction of the external magnetic field had the direction D'' relatively to the direction of axis $b$, the member 41 would engage the contact 42, the motor would turn in a direction opposite to that corresponding to the direction D' of the external field (that is, counter-clockwise) until the axis $b$ reaches the direction D''; then, the member 41 coming back to its neutral position, the motor would stop, leaving the axis $b$ pointing the direction D''. Thus, the core system M is always automatically adjusted to have the axis $b$ pointing the true direction, and this direction may be read on the scale 54, as already stated.

It must be understood that the automatic device just described may be used for other purposes than that of turning the core system. For example, the core system M may be adjustably fixed on an airplane and the motor connected with the steering system of the airplane so as to turn the latter to the left or to the right according to whether the contact member 41 of instrument I engages contact 42 or 43. Such an arrangement is able to automatically steer the airplane with any desired constant angular relation between the axis of the aeroplane and the direction of the earth magnetism.

As mentioned above the cores 1 and 2 may have any angular relation relatively to each other, and it would be unnecessary to show (in Figure 2) the case of parallel cores if a precaution had not to be taken; this precaution is that the primary windings 3 and 6 must be so arranged (so wound or so connected) as to create saturating fluxes X' and X'' in opposite directions, as indicated in Figure 2; this is obtained by turning the core 1 of Figure 1 clockwise through a right angle. It may be noticed that the bisecting axis b is then perpendicular to both cores. Otherwise the two Figures 1 and 2 are diagrammatically the same, except that it has been judged unnecessary to reproduce in Figure 2 all the elements shown in Figure 1 since they are the same and operate in the same manner in either arrangement.

The reason why the saturating fluxes in the two parallel cores must be in opposite directions is the following: Since the cores are parallel, the fluxes induced by the external magnetic field are equal and in the same direction in the two cores (X—Y) whatever the common direction of the cores is relatively to the external field; therefore, also the saturating fluxes, if they were in the same direction, would be equal whatever the direction of the cores is, as appears clearly from the explanations given above in connection with Figure 3, and no difference of electromotive force would be observed on instrument or relay I (no deflection of the pointer 41). But, assuming that the point $x$ on curve C (Figure 3) represents the flux induced by the external field in both cores, if the saturating fluxes are in opposite directions, the total fluxes may be represented by point $z$ for one of the cores and point $z'$ for the other core; then the total fluxes in the two cores, when saturated, are represented by the ordinates X' and X'', respectively; they may be equal only when the fluxes X induced by the external field are nil in both cores, that is to say, when the direction of the external field is perpendicular to the common direction of the cores, i. e. when this field is in the direction of axis $b$ of Figure 2.

In order to utilize with efficiency the magnetomotive forces developed by the primary winding, each core may be completed by an auxiliary part that closes the magnetic circuit of the fluxes induced by the primary winding. Figures 4, 5 and 6 show composite cores having such auxiliary parts.

In the composite core system shown in Figure 4, the core 1 is formed by part 1', which may be called the active part and which is preferably straight, and by the auxiliary part 1'' having the shape of an U. The primary winding 3 may be wound on either active or auxiliary part (shown as wound on the auxiliary part on Figure 4). The secondary winding 23 is wound on the active part in which the fluxes to be compared are induced. It is preferred to have the active part of the core made longer, of a substance more permeable and saturating faster, than the auxiliary part. Air gaps such as 60 may be left between the active part 1' and the auxiliary part 1''. Then, the flux induced by the external magnetic field in any of the cores will flow mainly through the active part since it is more extended and more permeable than the auxiliary part. On the other hand, the air gaps may avoid a leak through the auxiliary part of the flux (induced by the external field) entering at one end of the active part.

The core 2 of Figure 4 is formed with an active part 2' and an auxiliary part 2'' exactly similar to that of core 1 of the same figure. The primary winding 6 and the secondary winding 26 are also wound as on core 1 of this figure.

It is obvious that periodical direct currents in the primary winding 3 (or 6), if sufficient, will periodically saturate the active part between the air gaps; as the secondary 23 (or 26) is wound on the part which may be saturated, it is readily understood that the additional saturating fluxes will induce in this secondary winding electromotive forces in the same manner as in the secondaries wound on the simple cores of Figures 1 and 2. Therefore, if the cores of Figures 1 and 2 are substituted by the cores of Figure 4, nothing will be changed in the mode of operation.

The arrangement illustrated in Figure 5 relates specially to the device using parallel cores. The two parallel cores are assembled in a peculiar manner which may be better understood by referring, first, to Figure 6. In this latter figure, composite cores 1, 2 similar to those of Figure 4 are shown in alignment. The primary windings 6 and 3 of Figure 2 are replaced, in Figure 6, by a single winding 63 wound on both auxiliary parts 1'', 2'' of the two cores; this winding saturates the two active parts in contrary directions when a sufficient current flows through; therefore, the effect is the same as obtained with two windings 6 and 3 of Figure 2, and, if the circuits were completed on cores of Figure 6 as in Figure 2, the whole would operate in the same manner as in the device of Figure 2. It may be readily seen that this operation will be the same if the ends $e$ and $e'$ of the active parts 1' and 2' are joined together since the fluxes induced in these active parts by the external magnetic field are still the same. This is what is accomplished in the shape of double composite core shown in Figure 5. The active parts of the two cores are made in one piece (or cut in laminated sheets in common strips) 1'—2'; the auxiliary parts 1'' and 2'' are represented separate as in Figure 6, but they may also be joined together as one piece if desired. The primary winding 63 operates as indicated above in relation with Figure 6.

The secondary windings 23 and 26 may be connected together and to the other elements as in Figures 1 and 2 and then the whole would operate as explained in connection with these figures. Figure 5, however, shows a circuit of secondary windings a little different from that of Figures 1 and 2, which does not change the mode of operation, but which may be preferred when it is desired to prevent the currents generated in one of the windings from flowing through the other winding. In the arrangement of Figure 5, the secondary windings 23 and 26 are connected with rectifiers 65 and 66, respectively, arranged to rectify in contrary directions. The windings 23, 26, with their respective rectifiers, are connected in series together and with the instrument I and are shunted by respective resistances 67, 68. These resistances may be arranged as a potentiometer, that is to say, they may be constructed as a single resistance having an adjustable medium point of connection 69; thus the inequalities between the rectifiers may be corrected by the adjustment of the medium point 69. Indeed the instrument I may be arranged as a relay controlling a motor 50 as in Figure 1 and already described; also as in Figure 1 the motor may automatically adjust the core system M in a direction corresponding to the direction of the external magnetic field (by means of a worm 52 meshing with the gear 53 attached to the core system).

Although blending partly, the cores forming the core system of Figure 5 will still be understood in the expression "two cores" when not otherwise specified.

In Figures 1 and 5 the motor 50 and the instrument I are shown as being close to the core system M. It is obvious that these elements, particularly the motor, should be placed at a distance, because of their well known disturbing effect; this may be easily done by any person familiar with the art and, therefore, does not require description of means for doing it.

In the above description of the invention it has been supposed that the cores 1 and 2 and the windings (primary and secondary) were identical, and also that the direction of the magnetic field was observed by the equality of the electromotive forces induced in the secondary windings; these peculiarities, however preferred, are not essentials of the invention and it must be understood that different cores or different windings may be used, and that other ratio than equality may be observed on a suitable instrument.

It must be also understood that the invention may be used for other purposes than that of finding the direction of a magnetic field. For instance, it may be used for comparing the permeabilities of two specimens of cores; one of the specimens may replace the core 1 and the other may replace the core 2 (of Figures 1 or 2); the whole being placed in a magnetic field, in a suitable direction, the deflections of the pointer of instrument I may indicate equality or differences between the permeabilities of the two specimens.

Another use of the device described is to measure the intensity of an external magnetic field in any direction; this intensity is indicated by the deflection of the pointer of the instrument I since, as already explained, this deflection is proportional to, or a function of the difference $X'-Y'$ and, therefore a function of the intensity of the external magnetic field.

Of course, the instrument I may be calibrated so as to read directly on its scale the intensity of the external field.

Minor changes, such as the following, are within the scope of the invention:

The crossed cores of Figure 1, or the active parts of the composite cores of Figure 4, may be made by a single cross-like piece, or cut crosslike in laminated sheets, so as to have a common central part as shown in Fig. 7(a).

When the simple cores or active cores are parallel, they may be bridged at the center, the whole taking thus the shape of an H as shown in Fig. 7(b).

Further, it is obvious that the source 14 of alternating current, and the rectifier 16 connected in the circuit, may be replaced by any known means for inducing a periodical direct current (or pulsating current) in the primary winding or windings.

The rectifiers in the circuit of the secondary windings may be omitted when the period of currents in the primary windings is long (say, a period every two seconds) because, in such a case, the pointer of instrument I would indicate differences of electromotive force induced in the secondary windings, even without the rectifiers.

What I claim is:

1. Apparatus of the character described having, in combination, two permeable means each for receiving a flux from a magnetic field, means for periodically saturating said two permeable means by additional fluxes, and means for indicating the difference between respective additional fluxes in said two permeable means.

2. Apparatus of the character described having, in combination, two permeable means rotatable about an axis for receiving a flux from an external magnetic field, means for periodically saturating each of said permeable means by an additional flux, a relay, means controlled by the difference between said respective additional fluxes for actuating the relay, and means controlled by the relay for rotating said permeable means to a predetermined position relative to the direction of said external magnetic field.

3. Apparatus of the character described having, in combination, two permeable means having a directional axis for receiving fluxes from an external magnetic field, means for inducing in said permeable means additional fluxes to saturate the same periodically, windings on said permeable means in which electromotive forces are induced by said additional fluxes, and means controlled by difference between the electromotive forces induced by the respective additional fluxes for indicating the deflections of said directional axis from the direction of said external magnetic field.

4. Apparatus of the character described having, in combination, two permeable means having a directional axis for receiving fluxes from an external magnetic field, a primary winding system on said permeable means, means for inducing in said primary winding system currents to saturate periodically each of said two permeable means by additional fluxes, two secondary windings one on each of said permeable means, and means controlled by difference between the respective electromotive forces induced in the secondary windings by said additional fluxes for indicating the deflections of said directional axis from the direction of said external magnetic field.

5. Apparatus of the character described having, in combination, a pair of permeable rotatable means for receiving fluxes from an external magnetic field, means for inducing additional fluxes to saturate said permeable means, secondary windings, one on each permeable rotatable means in which electromotive forces are induced by said additional fluxes, a relay controlled by differences between the respective electromotive forces induced in said secondary windings, and means controlled by the relay for rotating the permeable means in accordance with the direction of said external magnetic field.

6. Apparatus of the character described having, in combination, two permeable means each for receiving a flux from an external magnetic field, means for inducing an additional saturating flux in each of said permeable means, two secondary windings in each of which an electromotive force is induced by the corresponding additional saturating flux, two rectifying means connected respectively in circuit with said secondary windings; and a galvanometric instrument connected in a common circuit of said secondary windings.

7. In combination, a magnetically permeable means, a winding on said permeable means, a rectifying means connected in series to said winding, an alternating current source connected in series with said rectifying means and with said winding, a condenser, and an adjustable resistance in series with said condenser, the condenser and the adjustable resistance being connected in shunt across said winding.

8. In combination, a magnetically permeable means, a winding on said permeable means, a source of periodical direct current connected to said winding, a condenser, and an adjustable resistance in series with said condenser, the condenser and the adjustable resistance being connected in shunt across said winding.

9. In combination, two magnetically permeable means having fixed angular relationship and adjustable as a unit in any desired fixed direction, a winding on each of said permeable means, a rectifying means connected to each winding, and a galvanometric instrument connected with the windings to indicate difference between the electromotive forces induced in the two windings.

10. A composite core having, in combination, an active part having a certain permeability for receiving fluxes from an external magnetic field, an auxiliary part having less permeability than said active part and closing a magnetical circuit with at least a portion of the same active part, and mean for periodically saturating in a single direction said active part while the auxiliary part is not saturated.

11. A flux characteristic comparison apparatus having, in combination, two composite cores in fixed angular relation to each other, each having two parts: an active part for receiving a flux from an external magnetic field and an auxiliary part closing a magnetic circuit with at least a portion of the corresponding active part, means on the magnetic circuits for periodically saturating the said portion of each active part by an additional flux, and a winding on each of said active parts in which electromotive force is induced by said additional flux.

12. In combination, a double composite core having, in combination, a straight part having a certain permeability for receiving a flux from said magnetic field, and two other similar parts having less permeability than said straight part and each closing a magnetical circuit with different portions of the same straight part.

13. Apparatus of the character described having, in combination, an active permeable means for receiving a flux from an external magnetic field, two auxiliary permeable means each closing a magnetic circuit with different portions of said active permeable means, means for periodically saturating each of said portions by an additional flux, a winding on each of said portions in which electromotive forces are induced by the corresponding additional flux, and means for indicating differences between the electromotive forces induced in the two windings.

14. The method of determining the direction of a magnetic field by means of two permeable cores, which consists in positioning the two cores to have an undetermined angular relation with the said direction so that they receive fluxes from the magnetic field, periodically saturating the cores by additional fluxes, and utilizing difference between the respective additional fluxes in the two cores for determining said relation.

15. The method of determining direction of a magnetic field by means of two parallel permeable cores, which consists in positioning the parallel cores to have an undetermined angular relation with the said direction so that they receive fluxes from the magnetic field, periodically saturating the two cores in opposite directions by additional fluxes, and utilizing difference between the respective additional fluxes in the two cores for determining said relation.

16. The method of automatically adjusting a system of two permeable cores in a predetermined angular relation with the direction of an external magnetic field, which consists in inducing in said two cores fluxes in addition to the fluxes induced by the external field so as to saturate periodically the cores, and utilizing difference between said fluxes in addition which saturate the cores for automatically rotating the cores until said predetermined angular relation is reached.

17. In combination, a straight permeable means, means for periodically saturating two parts of said permeable means in opposite directions, two windings each wound on a respective one of said two parts and in which electromotive forces are induced by the corresponding saturating fluxes, and means for indicating difference between the respective electromotive forces induced in the two windings.

18. Apparatus of the character described having, in combination, two permeable means having a directional axis each for receiving a flux from an external magnetic field, windings on said permeable means, means for inducing in said windings currents to saturate periodically each of said permeable means by additional fluxes, and means controlled by difference between said respective additional fluxes for indicating the deflections of the directional axis from the direction of said external magnetic field.

19. A flux characteristic comparison apparatus comprising, in combination, two composite cores in fixed angular relation to each other, each having two parts: an active part for receiving a flux from an external magnetic field and an auxiliary part closing a magnetic circuit with at least a portion of the corresponding active part, and means on each of said magnetic circuits for periodically saturating said portions of each active part, while the corresponding auxiliary part is not saturated.

20. In combination, a straight permeable means positioned to be partially saturated by an external magnetic field, means for periodically inducing additional saturating fluxes in two parts of said permeable means in opposite directions and means for measuring difference between the respective additional saturating fluxes in said two parts.

21. The method of determining a characteristic of an external magnetic field which consists in positioning two cores in predetermined fixed angular relation so that non-saturating fluxes are induced therein by said field, periodically saturating the two cores by inducing additional fluxes therein, and comparing the difference between the respective additional fluxes as a measure of said characteristic.

HAIG ANTRANIKIAN.